United States Patent [19]

Burnier

[11] Patent Number: 5,118,735
[45] Date of Patent: Jun. 2, 1992

[54] ORGANOSILICON COMPOSITION COMPRISING STABILIZERS

[75] Inventor: Julia S. Burnier, Wilmington, Del.

[73] Assignee: Hercules Incorporated, Wilmington, Del.

[21] Appl. No.: 593,167

[22] Filed: Oct. 5, 1990

[51] Int. Cl.$^5$ .................... C08K 5/3435; C08K 5/18
[52] U.S. Cl. .................... 524/99; 524/100; 524/102; 524/255; 524/257; 524/258; 524/291; 524/343; 524/349; 524/350; 524/588
[58] Field of Search ................ 524/99, 255, 257, 258, 524/588, 100, 102, 291, 343, 349, 350; 528/25

[56] References Cited

U.S. PATENT DOCUMENTS

| | | | |
|---|---|---|---|
| 2,938,010 | 5/1960 | Bluestein | 524/588 |
| 4,007,230 | 2/1977 | Hinze | 260/611.5 |
| 4,021,385 | 5/1977 | Austin et al. | 260/611.5 |
| 4,046,737 | 9/1977 | Holt et al. | 260/45.8 N |
| 4,110,304 | 8/1978 | Gilg et al. | 260/45.8 |
| 4,198,334 | 4/1980 | Rasberger | 106/176 |
| 4,419,472 | 12/1983 | Berner et al. | 524/102 |
| 4,822,839 | 4/1989 | Paisner | 524/239 |
| 4,877,820 | 10/1989 | Cowan | 523/222 |
| 4,900,779 | 2/1990 | Leibfried | 524/862 |
| 4,902,731 | 2/1990 | Leibfried | 523/222 |
| 5,008,360 | 4/1991 | Bard et al. | 528/25 |
| 5,013,809 | 5/1991 | Leibfried | 528/25 |
| 5,025,048 | 6/1991 | Burnier | 524/99 |

Primary Examiner—Veronica P. Hoke
Attorney, Agent, or Firm—Mark D. Kuller

[57] ABSTRACT

A composition comprising (A) (i) a crosslinked organosilicon polymer or crosslinkable organosilicon prepolymer comprising alternating (a) cyclic polysiloxane or tetrahedral siloxysilane residues and (b) polycyclic hydrocarbon residues derived from polycyclic polyenes having at least two non-aromatic, non-conjugated carbon-carbon double bonds in their rings linked through carbon to silicon bonds, wherein at least one of the cyclic polysiloxanes or tetrahedral siloxysilanes (a) or the polycyclic polyenes (b) used to form the polymer or prepolymer has more than two reactive sites; or (ii) a crosslinked or crosslinkable linear poly(organohydrosiloxane) polymer having at least 30% of its ≡SiH groups reacted to hydrocarbon residues derived from polycyclic polyenes having at least two non-aromatic, non-conjugated carbon-carbon double bonds in their rings; and (B) as an antioxidant, (i) at least one compound containing a hindered phenol substituent and (ii) at least one compound containing a substituent selected from the group consisting of hindered amines and aromatic amines; and the process of making the same, are disclosed.

20 Claims, No Drawings

ORGANOSILICON COMPOSITION COMPRISING STABILIZERS

This invention is directed to stabilization of certain organosilicon polymers and prepolymers using the combination of at least one compound having a hindered phenol substituent and at least one compound having a substituent selected from hindered amines and aromatic amines. The organosilicon polymers and prepolymers are comprised of (a) hydrocarbon residues derived from polycyclic polyenes and (b) residues derived from linear poly(organosiloxane)s, cyclic polysiloxanes or tetrahedral siloxysilanes.

BACKGROUND OF THE INVENTION

Leibfried, in U.S. Pat. Nos. 4,900,779, and 4,902,731, and U.S. Patent Application Ser. Nos. 07/419,429 (filed Oct. 10, 1989, now U.S. Pat. No. 5,013,809) and Ser. No. 07/419,430 filed Oct. 10, 1989, now allowed), and Bard and Burnier, in U.S. Patient Application Ser. No. 07/422,214 (filed Oct. 16, 1989, now U.S. Pat. No. 5,008,360) describe crosslinked organosilicon polymers and crosslinkable organosilicon prepolymers comprised of alternating polycyclic hydrocarbon residues and cyclic polysiloxanes or siloxysilane residues linked through carbon to silicon bonds. Cowan, in U.S. Pat. No. 4,877,820, discloses crosslinked or crosslinkable linear poly(organohydrosiloxane) polymers having at least 30% of their ≡SiH groups reacted with hydrocarbon residues derived from polycyclic polyenes.

These polymers and prepolymers are often stored over long periods of time. In addition, the prepolymers are often cured at high temperatures and the polymers are often exposed to high temperatures during use. They contain residual =Si—H groups and carbon-carbon double bonds which cause them to be thermally unstable, particularly over long periods of time and especially at elevated temperatures. The instant inventor has discovered that the crosslinked organosilicon polymers and prepolymers can be stabilized using the combination of at least one compound having a hindered phenol substituent and at least one compound having a substituent selected from hindered amines and aromatic amines.

SUMMARY OF THE INVENTION

Accordingly, this invention is directed to a composition comprising:

(A) (i) a crosslinked organosilicon polymer or crosslinkable organosilicon prepolymer comprising alternating (a) cyclic polysiloxane or tetrahedral siloxysilane residues and (b) polycyclic hydrocarbon residues derived from polycyclic polyenes having at least two non-aromatic, non-conjugated carbon-carbon double bonds in their rings linked through carbon to silicon bonds, wherein at least one of the cyclic polysiloxanes or tetrahedral siloxysilanes (a) or the polycyclic polyenes (b) used to form the polymer or prepolymer has more than two reactive sites; or (ii) a crosslinked or crosslinkable linear poly(organohydrosiloxane) polymer having at least 30% of its≡SiH groups reacted to hydrocarbon residues derived from polycyclic polyenes having at least two non-aromatic, non-conjugated carbon-carbon double bonds in their rings; and (B) as antioxidants, (i) at least one compound containing a hindered phenol substituent and (ii) at least one compound containing a substituent selected from the group consisting of hindered amines and aromatic amines.

DETAILED DESCRIPTION OF THE INVENTION

Herein, "SiH" is be used to describe hydrosilation reactable≡SiH groups.

Any cyclic polysiloxane or tetrahedral siloxysilane with two or more hydrogen atoms bound to silicon can be used to form the crosslinked organosilicon polymer or hydrosilation crosslinkable organosilicon prepolymer (A) (i). Cyclic polysiloxanes useful in forming the products of this invention have the general formula:

wherein R is hydrogen, a saturated, substituted or unsubstituted alkyl or alkoxy radical, a substituted or unsubstituted aromatic or aryloxy radical, n is an integer from 3 to about 20, and R is hydrogen on at least two of the silicon atoms in the molecule.

Examples of reactants of Formula (Ia) include, e.g., tetra- and penta-methylcyclotetrasiloxanes; tetra-, penta-, hexa- and hepta-methylcyclopentasiloxanes; tetra-, penta- and hexa-methylcyclohexasiloxanes, tetraethyl cyclotetrasiloxanes and tetraphenyl cyclotetrasiloxanes. Preferred are 1,3,5,7-tetramethylcyclotetrasiloxane, 1,3,5,7,9-pentamethylcyclopentasiloxane and 1,3,5,7,9,11-hexamethylcyclohexasiloxane, or blends thereof.

The tetrahedral siloxysilanes are represented by the general structural formula:

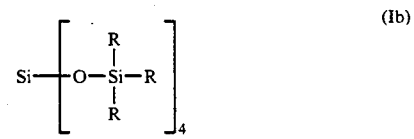

wherein R is as defined above and is hydrogen on at least two of the silicon atoms in the molecule.

Examples of reactants of Formula (Ib) include, e.g., tetrakisdimethylsiloxysilane, tetrakisdiphenylsiloxysilane, and tetrakisdiethylsiloxysilane. The tetrakisdimethylsiloxysilane is the best known and preferred species in this group.

Polymers and prepolymers made with cyclic polysiloxanes or tetrahedral siloxysilanes may also contain other hydrosilation reactable polysiloxanes bearing two or more SiH groups. For instance, they may contain linear, short chain SiH terminated polysiloxanes having the general formula:

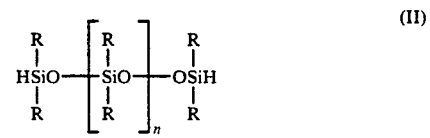

wherein n is 0 to 1000 and R is alkyl or aryl, preferably methyl or phenyl, as described by Leibfried in U.S. patent application Ser. Nos. 07/419,429 and 07/419,430, supra. These linear, short chain SiH terminated polysiloxanes impart flexibility to the cured polymers and can be used to produce elastomers.

The linear poly(organohydrosiloxane) preferably has the general formula:

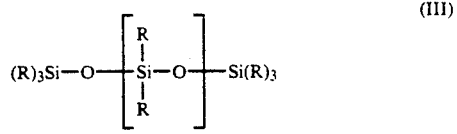

(III)

wherein R is a substituted or unsubstituted, saturated alkyl radical or a substituted or unsubstituted phenyl radical, and about 5% to about 50% of the R's are hydrogen and m is an integer from about 3 to 100, and the maximum value of m is preferably 40.

Exemplary linear poly(organohydrosiloxanes) include:
trimethylsiloxy-terminated dimethylsiloxanemethylhydrosiloxane copolymer,
dimethylsiloxy-terminated dimethylsiloxanemethylhydrosiloxane copolymer,
dimethylsiloxy-terminated polydimethylsiloxane,
trimethylsiloxy-terminated methyloctylsiloxanemethylhydro-siloxane copolymer,
dimethylsiloxy-terminated phenylmethylsiloxanemethylhydro-siloxane copolymer,
trimethylsiloxy-terminated methylcyanopropylsiloxane-methylhydrosiloxane copolymer,
trimethylsiloxy-terminated 3,3,3-trifluoropropylmethylsiloxane methylhydrosiloxane copolymer,
trimethylsiloxy-terminated 3-aminopropylmethyl siloxane-methylhydrosiloxane copolymer,
trimethylsiloxy-terminated 2-phenylethylmethyl siloxane-methylhydrosiloxane copolymer, and
trimethylsiloxy-terminated 2-(4-methylphenyl)-ethylmethyl-siloxane-methylhydrosiloxane copolymer.

Polycyclic polyenes useful in preparing the composition of this invention are polycyclic hydrocarbon compounds having at least two non-aromatic, non-conjugated, carbon-carbon double bonds. Illustrative are compounds selected from the group consisting of cyclopentadiene oligomers (e.g., dicyclopentadiene, tricyclopentadiene and tetracyclopentadiene), norbornadiene dimer, bicycloheptadiene (i.e., norbornadiene) and its Diels-Alder oligomers with cyclopentadiene (e.g., dimethanohexahydronaphthalene), and substituted derivatives of any of these, e.g., methyl dicyclopentadienes. Preferred are cyclopentadiene oligomers, such as dicyclopentadiene and tricylopentadiene. Two or more polycyclic polyenes can be used in combination.

Other hydrocarbon compounds may also be used. For instance, according to one embodiment described in U.S. patent application Ser. No. 07/422,214, supra, the hydrocarbon component comprises (a) at least one low molecular weight (typically having a molecular weight less than 1,000, preferably less than 500) polyene having at least two non-aromatic, non-conjugated, carbon-carbon double bonds highly reactive in hydrosilation (they may contain other less reactive (including unreactive) double-bonds, provided that those double bonds do not interfere with the reactivty of the highly reactive double bonds; but, compounds having only two highly reactive double bonds are preferred), the carbon-carbon double bonds being either in an alpha, beta or gamma position on a linear carbon moiety, next to two bridgehead positions in a strained polycyclic aliphatic ring structure, or in a cyclobutene ring, and (b) at least one polycyclic polyene having at least two chemically distinguishable non-aromatic, non-conjugated carbon-carbon double bonds in its rings. Examples of component (a) include 5-vinyl-2-norbornene, o-, m- or p-diisopropenylbenzene, o-, m- or p-divinylbenzene, diallyl ether, diallyl benzene, dimethanohexahydronaphthalene and the symmetrical isomer of tricyclopentadiene. By "having at least two chemically distinguishable carbon-carbon double bonds" it is meant that at least two carbon-carbon double bonds have widely different rates of reaction in hydrosilation and that one of the double bonds will react prior to substantial reaction of the other double bond(s). This first double bond must be quite reactive in hydrosilation. Reactive double bonds include those that are next to two bridgehead positions in a strained polycyclic aliphatic ring structure or in a cyclobutene ring, as per component (a) of the embodiment described directly above. The other carbon-carbon double bond(s) may be any other non-aromatic, 1,2-disubstituted non-conjugated carbon-carbon double bond that is not next to two bridgehead positions in a strained polycyclic aliphatic ring structure and is not in a cyclobutene ring. Examplary are dicyclopentadiene and the asymmetrical isomer of tricyclopentadiene. Preferred, for some applications, when using these hydrocarbon compounds are cyclic polysiloxanes containing three or more SiH groups.

The reactions for forming the organosilicon prepolymers and polymers of this invention are described in U.S. Patent Application Ser. Nos. 07/419,429, 07/419,430 and 07/422,214, and U.S. Pat. Nos. 4,877,820, 4,900,779 and 4,902,731, supra. The reactions for forming the prepolymer and for forming a polymer from the prepolymer can be promoted thermally or by the addition of a hydrosilation catalyst or radical generators such as peroxides and azo compounds. Hydrosilation catalysts include metal salts and complexes of Group VIII elements. The preferred hydrosilation catalysts contain platinum (e.g., PtCl$_2$, dibenzonitrile platinum dichloride, platinum on carbon, etc.). The preferred catalyst, in terms of both reactivity and cost, is chloroplatinic acid (H$_2$PtCl$_6$.6H$_2$O). Catalyst concentrations of 0.0005 to about 0.05% by weight of platinum, based on the weight of the monomers, are preferred.

To prepare the thermoset and thermoplastic polymers, several approaches are available. It is possible, by selection of reactants, reactant concentrations and reaction conditions, to prepare polymers exhibiting a broad range of properties and physical forms. Thus, it has been found possible to prepare tacky solids, elastomeric materials, and tough glassy polymers.

In one approach, the correct relative ratios of reactants and the platinum catalyst are simply mixed and brought to a temperature at which the reaction is initiated and proper temperature conditions are thereafter maintained to drive the reaction to substantial completion (typically, with a ratio of carbon-carbon double bonds to SiH groups of about 1:1, when 70 to 90% of the SiH groups are consumed).

Generally, with cyclic polysiloxanes or tetrahedral siloxysilanes, thermoset polymers result when the ratio of carbon-carbon double bonds of (b) to SiH groups in (a) is in the range of from about 0.5:1 up to about 1.3:1, more preferably from about 0.8:1 up to about 1.1:1. The alternating residues form a cross-linked thermoset structure.

B-stage type prepolymers can be prepared as disclosed in U.S. Patent Application Ser. No. 07/422,214, and U.S. Pat. Nos. 4,877,820 and 4,902,731, supra. Generally, the initial product of the reaction at lower temperatures, e.g., about 25° to about 80° C., is a crosslinkable prepolymer, which may be in the form of a solid or a flowable, heat-curable liquid, even though the ratio of carbon-carbon double bonds to SiH groups is otherwise suitable for cross-linking. The prepolymers generally have 30 to 70% of the SiH groups reacted, and when liquids are desired preferably about 30 to 60% of the SiH groups reacted. Such prepolymers, analogous to the so-called B-stage resins encountered in other thermoset preparations, can be recovered and subsequently transferred to a mold for curing.

These prepolymers are prepared using polycyclic polyenes having at least two chemically distinguishable non-aromatic, non-conjugated carbon-carbon double bonds in their rings. Illustrative are compounds selected from the group consisting of dicyclopentadiene, asymmetrical tricyclopentadiene, and methyl dicyclopentadiene, and substituted derivatives of any of these. Preferred is dicyclopentadiene. Such prepolymers can also be prepared with the hydrocarbon combinations described in U.S. Patent Application Ser. No. 07/422,214, supra.

The prepolymers, including the viscous, flowable liquid prepolymers, are stable at room temperature for varying periods of time, and cure upon reheating to an appropriate temperature, e.g., about 100° to about 250° C. Often, additional catalyst is added to the prepolymer prior to cure to further promote the reaction.

A second type of prepolymer can be prepared by a process described in U.S. Patent Application Ser. Nos. 07/419,429 and 07/419,430. In this process, an olefin rich prepolymer is prepared by reacting a large excess of polycyclic polymers with cyclic siloxanes or tetrahedral siloxysilanes. The olefin rich organosilicon prepolymer is blended with additional cyclic polysiloxane or tetrahedral siloxysilane before cure.

According to this process, organosilicon prepolymers are made with a large excess of carbon-carbon double bonds available for reaction with SiH groups. That is, the ratio of carbon-carbon double bonds in the rings of the polycyclic polyenes used to form the polycyclic polyene residues (a) to SiH groups in the cyclic polysiloxanes and tetrahedral siloxysilanes used to form the cyclic polysiloxane or tetrahedral siloxysilane residues (b) is greater than 1.8:1, preferably greater than 1.8:1 and up to 2.2:1.

The prepolymers of this embodiment are generally in the form of flowable liquids, which are stable at room temperature. The most stable prepolymers are formed at a double bond to SiH ratio of about 2:1 since virtually all polyene is reacted and excess polycyclic polyene need not be removed. (Due to their odor, the presence of unreacted polycyclic polyenes is undesirable. When necessary or desirable, unreacted polycyclic polyenes can be stripped, e.g., using a rotoevaporator, to form odorless compositions.)

Later, crosslinked polymers are formed by mixing the prepolymers with the polysiloxanes/siloxysilanes such that the total ratio of non-aromatic, non-conjugated carbon-carbon double bonds in the rings of the polycyclic polyenes used to form the polycyclic polyene residues (a) to SiH groups in the polysiloxanes and siloxysilanes used to form the polysiloxane/siloxysilane residues (b) is in the ratio of 0.4:1 to 1.7:1; preferably 0.8:1 to 1.3:1, most preferably about 1:1, and curing the mixture in the presence of a hydrosilation catalyst.

Preferably, according to this embodiment, the organosilicon prepolymers are reacted with the polysiloxanes and/or siloxysilanes to form a crosslinked polymer in a mold. The prepolymers and polysiloxanes/siloxysilanes are stored separately and are blended before entering the mold. The hydrosilation catalyst may be present in either or both stream(s) or injected directly into the mixer. The reaction is exothermic and proceeds rapidly so that the polymer gels and the product can be removed from the mold in minutes. The components of the blends are completely stable until they are mixed. This permits indefinite ambient storage of the materials.

Alternately, the blend components can be premixed and stirred in a tank. These blends have low viscosity and are pumpable. Addition of catalyst and/or application of heat can be used to cure the prepolymer composition. The reaction may be carried out in an extruder, mold or oven, or the blend may be applied directly on a substrate or part.

With all of the above processes, the reaction speed and its accompanying viscosity increase can be controlled by use of a cure rate retardant (complexing agent), such as N,N,N',N'-tetramethylethylenediamine, diethylenetriamine or phosphorus compounds.

A number of options exist for incorporating additives into the prepolymers or polymers of this invention. Additives such as fillers and pigments are readily incorporated. Carbon black, vermiculite, mica, wollastonite, calcium carbonate, silica, fused silica, fumed silica, glass spheres, glass beads, ground glass and waste glass are examples of fillers which can be incorporated. Fillers can serve either as reinforcement or as fillers and extenders to reduce the cost of the molded product. Glass spheres are useful for preparing low density composites. When used, fillers can be present in amounts up to about 80%.

Fiber reinforced composites may be made with the prepolymers of this invention. They can contain as much as 80%, preferably 30 to 60%, by weight, of fibrous reinforcement. Fibrous reinforcement useful in this invention includes glass, etc., as described in U.S. Pat. Nos. 4,900,779 and 4,902,731.

The polymers of this invention have excellent electrical insulating properties and resistance to moisture. Often, they have high glass transition temperatures.

The polymers and prepolymers of this invention are well-suited for electronic applications, e.g., composites, adhesives, encapsulants, potting compounds and coatings. They are especially useful for preparing laminates, such as those used for printed circuit boards.

An elastomer can be added to improve toughness. Preferred are hydrocarbon elastomers having a molecular weight of less than 100,000 and low molecular weight siloxane elastomers. Exemplary hydrocarbon elastomers are low molecular weight ethylene-propylene-diene terpolymers, low molecular weight butyl rubber, partially hydrogenated low molecular weight polyisoprene or natural rubber, and partially hydrogenated low molecular weight polybutadiene or styrene-butadiene copolymers. Exemplary siloxane rubbers include low molecular weight vinyl or SiH terminated polydimethyl/diphenyl siloxane copolymers. Preferred are low molecular weight ethylene-propylene-dicyclopentadiene and ethylene-propylene-ethylidenenorbornene polymers having a molecular weight of 5500 to 7000. Most preferred is Trilene 65 elastomer (Uniroyal, Middlebury, CT). Elastomers are generally used in an amount of 0.5 to 20%, preferably 3 to 12%, and most preferably 5 to 10%, by weight of the total composition. Higher levels may be useful in some applications. Elastomers may be added to the monomers or to a prepolymer.

Compounds having a hindered phenol substituent are well known, for instance as shown in U.S. Pat. Nos. 4,822,839 (Paisner), 4,007,230 (Hinze) and 4,021,385 (Austin). Exemplary are octadecyl 3,5-di-tert-butyl 4-hydroxyhydrocinnamate, tetrakis (methylene 3-(3,5-di-t-butyl-4-hydroxyphenyl) proportionate) methane, 4,4'-methylenebis (2,6-di-t-butylphenol), 2,6-di-t-butyl-p-cresol, 1,3,5-trimethyl-2,4,6-tris (3,5-di-t-butyl-4-hydroxybenzyl)benzene, 2,2'-methylene bis(6-t-butyl-p-cresol), the butylated reaction product of p-cresol and dicyclopentadiene (Wingstay L, Goodyear Tire and Rubber Company, Akron, Ohio), monomethacrylate ester of 2,2'-methylene bis (4-methyl-6-t-butyl phenol), and butylated hydroxytoluene (also known as 2,6-di-t-butyl-p-cresol and 2,6-di-tert-butyl-4-methylphenol), with the first being preferred.

Compounds having a hindered amine substituent are well known, for instance as shown in U.S. Pat. Nos. 4,110,304, 4,419,472 and 4,046,737. Exemplary are bis (1,2,2,6,6-pentamethyl-4-piperidinyl) sebacate, bis (2,2,6,6-tetramethyl-4-piperidinyl) sebacate, poly(2-N,N'-di (2,2,6,6-tetramethyl-4-piperiidinyl)hexane diamine)-4-(1-amino-1,1,3,3-tetramethylbutane) sym triazine and dimethyl succinate polymer with 4-hydroxy-2,2,6,6-tetramethyl-1-piperidineethanol, with the first being preferred.

Compounds having an aromatic amine (also known as "aryl amine") substituent are well known as shown by U.S. Pat. Nos. 4,822,839 (Paisner), 4007,230 (Hinze) and 4,021,385 (Austin). Exemplary are diphenyl phenylenediamine, octylated diphenylamine, 4,4'-di (alpha, alpha'-dimethylbenzyl) diphenylamine, N-phenyl-N'-(1,3-dimethylbutyl)p-phenylenediamine and (4-anilinophenyl)-methacrylate.

The compound(s) having a substituent selected from the group consisting of hindered amines and aromatic amines are generally used in an amount of 0.4 to 3.5, preferably 1.0 to 2.5 millimoles of amine for every 100 grams of resin. The molar ratio of hindered phenolic to aromatic amine and hindered amine can range from 10:90 to 90:10, preferably 30:70 to 90:10, and most preferably 50:50 to 90:10.

The preferred antioxidation stabilizer system consists of a compound having a hindered amine and a compound having a hindered phenol.

The following examples are presented to demonstrate this invention. They are not intended to be limiting. Therein, all percentages, parts, etc., are by weight unless otherwise indicated.

Example 1

In this example, various antioxidants were tested by themselves and as phenolic/amine blends to show the advantage of the latter.

A 3,000 ppm chloroplatinic acid/dicyclopentadiene (CPA/DCPD) catalyst complex was prepared by placing 0.300 parts CPA and 100 parts DCPD into a glass container, sparging with nitrogen for 5 minutes and stirring at 50°-70° C. for one hour. Afterwards, the complex was allowed to cool to room temperature. This catalyst will be referred to as the "CPA/DCPD complex".

Into a glass container were added 60.0 parts of methyl hydrocyclosiloxanes (a mixture of predominantly 8, 10, and 12 membered siloxane rings) ("MHCS"), 62.7 parts of dicyclopentadiene ("DCPD"), and 3.1 parts CPA/DCPD complex. The container was placed in a large 25° C. water bath (so that the temperature of the mixture was maintained within the range of 1°-5° C. above the bath temperature) and stirred for 14 hours at which time all the reactive norbornenyl bonds of DCPD were shown to be hydrosilated by H-NMR.

The resin was split into ten portions of 10.0 grams each. The antioxidant or blend of antioxidants listed in the table below was blended into each sample until it was well dispersed. Each sample had a total of 0.28 milliequivalents of phenol and amine (0.028 meg/g resin). In samples containing phenol and amine blends, 0.14 milliequivalents were phenolic and 0.14 milliequivalents were amine. Then, the samples were cured under a nitrogen atmosphere at 150° C. for 2 hours and then at 275° C. for 2 hours.

The cooled samples were then tested using high pressure oxygen differential scanning calorimetry ("DSC") at 180° C. under 550 pounds per square inch of oxygen pressure (an accelerated thermal aging environment) to determine the relative effectiveness of each antioxidant or antioxidant blend. The longer the time to max exotherm (oxidation), the more oxidatively stable the polymer.

TABLE 1

| Sample | Antioxidant(s) | Weight %[1] | Avg Time to Max Exotherm (minutes) |
|---|---|---|---|
| A | None (Control) | 0% | 0.8 |
| B | Hindered Phenol[2] | 1.46% | 27.4 |
| C | Hindered Phenol[3] | 1.13% | 7.9 |
| D | Aromatic Amine[4] | 1.09% | 10.2 |
| E | Aromatic Amine[5] | 0.70% | 12.7 |
| F | Hindered Amine[6] | 0.67% | 16.7 |
| G | Hindered Phenol[2] + Aromatic Amine[5] | 0.73% + 0.35% | 33.4 |
| H | Hindered Phenol[2] + Aromatic Amine[4] | 0.73% + 0.55% | 36.7 |
| I | Hindered Phenol[3] + Aromatic Amine[5] | 0.57% + 0.35% | 14.5 |
| J | Hindered Phenol[3] + Aromatic Amine[4] | 0.57% + 0.55% | 16.6 |
| K | Hindered Phenol[2] + Hindered Amine[6] | 0.48% + 0.48% | 44.0 |

[1]By total weight of the polymer.
[2]Octadecyl 3,5-di-tert-butyl 4-hydroxyhydrocinnamate (Naugard 76, Uniroyal Chemical Company, Inc., Middlebury, CT).
[3]Monomethacrylate ester of 2,2'-methylene bis(4-methyl-6-t-butyl phenol).
[4]Octylated diphenylamine.
[5](4-Anilinophenyl)-methacrylate.
[6]Bis (1,2,2,6,6-pentamethyl-4-piperidinyl) sebacate (Tinuvin 765, Ciba-Geigy, Hawthorne, New York).

The samples containing phenolic/amine antioxidant blends gave higher exotherm times than samples containing the individual antioxidants. This shows that blends of antioxidants containing both hindered or aromatic amine and hindered phenol functionality are better as stabilizers (i.e., better at preventing oxidation) for the organasilicon polymers of this invention than antioxidants having only aromatic amine or only hindered amine or only hindered phenol functionality.

Example 2

In this example, a hindered phenol and a hindered amine were blended into a polymer at various phenol/amine ratios.

The resin and polymer/antioxidant blends were prepared as in Example 1, with each sample having both a hindered phenol (octadecyl 3,5-di-tert-butyl 4-hydroxyhydrocinnamate) and a hindered amine (bis (1,2,2,6,6-pentamethyl-4-piperidinyl) sebacate (except control Sample A, which did not contain an antioxidant). The cured samples were tested by high pressure oxygen DSC as in Example 1. Each sample (except the control A) had a total of 0.28 milliequivalents of phenol and amine (0.028 milliequivalents/g resin). The results are shown in the table below.

TABLE 2

| Sample | Phenol/Amine Weight Ratio | Phenol/Amine Molar Ratio | Average Time to Maximum Exotherm (Minutes) |
|---|---|---|---|
| A | None | None | <2 |
| B | 0.25 | 10/90 | 23.6 |
| C | 0.93 | 30/70 | 40.5 |
| D | 4.95 | 70/30 | 48.8 |
| E | 18.71 | 90/10 | 43.2 |

This example shows that good thermal oxidative stabilization can be obtained with a wide range of hindered phenol/hindered amine ratios.

Example 3

In this example, a hindered phenol and a hindered amine were blended into a polymer at a fixed phenolic/amine molar ratio of 70/30 but at various levels.

The resin and polymer/antioxidant blends were prepared as in Example 1, using the hindered phenol and hindered amine used in Example 2. The cured samples were tested by high pressure oxygen DSC as in Example 1. The results are shown in the table below.

TABLE 3

| Sample | Weight % Phenol | Weight % Amine | Total Weight % Antioxidants | Total Millimoles Antioxidant in 10 g | Average Time to Maximum Exotherm (Minutes) |
|---|---|---|---|---|---|
| A | 0 | 0 | 0 | 0 | <2 |
| B | 0.83 | 0.17 | 1.0 | 0.22 | 21.0 |
| C | 1.25 | 0.25 | 1.5 | 0.33 | 44.1 |
| D | 1.66 | 0.34 | 2.0 | 0.44 | 50.7 |
| E | 2.08 | 0.42 | 2.5 | 0.56 | 60.9 |
| F | 2.50 | 0.50 | 3.0 | 0.67 | 63.0 |

This example shows that the level of oxidative stabilization increases with the amount of antioxidant used and begins to level off at about 2.5 to 3.0%, by weight in the polymer.

Example 4

This example illustrates the effectiveness of the antioxidant blends of this invention in slowing down the degradation of laminate properties under accelerated aging conditions.

A prepolymer was prepared by placing 38.4 parts MHCS, 1.87 parts hindered phenol (octadecyl 3,5-di-tert-butyl 4-hydroxyhydrocinnamate) and 0.38 parts hindered amine (bis (1,2,2,6,6-pentamethyl-4-piperidinyl) into a round bottom flash fitted with a condenser, heating mantle, and dropping funnel. A blend of 21.7 parts DCPD, 30.0 parts tricyclopentadiene, 7.0 parts elastomer (Trilene 65), 0.66 parts CPA/DCPD complex (3,050 ppm Pt), and 25.0 parts toluene were placed into the dropping funnel. The flask contents were heated to 70° C. and the dropping funnel contents were added dropwise so as to maintain the temperature between 70° C. and 85° C. Once the contents were been added, the prepolymer was allowed to cool to room temperature. An additional 24 ppm Pt was added as PC075 (a Pt-siloxane complex sold by Huls America, Bristol, PA) to adjust the gel behavior of the prepolymer to 5 minutes at 130° C.

Prepregs (impregnated glass fabric) were prepared by dipping 7628 style glass fabric through the prepolymer solution and heating for about 200 seconds in a 130° C. forced air oven. A series of laminates were prepared by stacking prepregs between Teflon film and stainless steel plates and curing in a heated press for 1 hour at 170° C. at 750 pounds per square inch of pressure. After cooling, the laminates were placed in a nitrogen sparged oven and postcured for 4 hours at 250° C.

The laminates were cut into a number of 3 inch ×1 inch flexural strength specimens and placed in a 180° C. forced air oven. Every three weeks, a set of five specimens was removed and submitted for testing. The results are shown in the table below.

TABLE 4

| Aging Time (Weeks) | Average Flexural Strength (Kpsi) | % Flexural Strength Retention |
|---|---|---|
| 0 | 42.3 | 100 |
| 3 | 39.6 | 94 |
| 6 | 33.2 | 79 |
| 9 | 35.0 | 83 |
| 12 | 32.9 | 78 |
| 15 | 27.6 | 65 |
| 18 | 22.1 | 52 |
| 21 | 21.2 | 50 |
| 24 | 15.5 | 37 |

Identical laminates prepared without any antioxidant degrade severely in less than 1 week at 180° C. Therefore, this example shows that the antioxidant blends of this invention are effective in slowing down the degradation of laminate properties under accelerated aging conditions.

While the invention has been described with respect to specific embodiments, it should be understood that they are not intended to be limiting and that many variations and modifications are possible without departing from the scope and spirit of this invention.

What I claim is:

1. A composition comprising:
   (A) (i) a crosslinked organosilicon polymer or crosslinkable organosilicon prepolymer comprising alternating (a) cyclic polysiloxane or tetrahedral siloxysilane residues and (b) polycyclic hydrocarbon residues derived from polycyclic polyenes having at least two non-aromatic, non-conjugated, carbon-carbon double bonds in their rings linked through carbon to silicon bonds, wherein at least one of the cyclic polysiloxanes or tetrahedral siloxysilanes (a) or the polycyclic polyenes (b) used to form the polymer of prepolymer has more than two reactive sites; or (ii) a crosslinked or crosslinkable linear poly(organohydrosiloxane) polymer having at least 30% of its ≡SiH groups reacted with hydrocarbon residues derived from polycyclic polyenes having at least two non-aromatic, non-conjugated, carbon-carbon double bonds in their rings; and
   (B) as antioxidants, (i) at least one first compound containing a hindered phenol substituent and (ii) at least one second compound containing a substituent selected from the group consisting of hindered amines and aromatic amines.

2. A composition as claimed in claim 1 wherein the second compound (B) (ii) is selected from the hindered amines.

3. A composition as claimed in claim 1 wherein the second compound (B) (ii) is selected from the aromatic amines.

4. A composition as claimed in claim 1 wherein the compound containing a hindered phenol substituent is selected from the group consisting of octadecyl 3,5-di-tert-butyl-4-hydroxyhydrocinnamate; tetrakis (methylene 3-(3,5-di-t-butyl-4-hydroxyphenyl) proportionate) methane; 4,4'-methylenebis (2,6-di-t-butylphenol), 2,6-di-t-butyl-p-cresol; 1,3,5-trimethyl-2,4,6-tris (3,5-di-t-butyl-4-hydroxybenzyl)benzene; 2,2'-methylene bis(6-t-butyl-p-cresol), the butylated reaction product of p-cresol and dicyclopentadiene, monomethacrylate ester of 2,2'-methylene bis(4-methyl-6-t-butyl phenol), and butylated hydroxytoluene.

5. A composition as claimed in claim 4 wherein the second compound (B) (ii) is selected from the group consisting of bis (1,2,2,6,6-pentamethyl-4-piperidinyl) sebacate, bis (2,2,6,6-tetramethyl-4-piperidinyl) sebacate, poly(2-N,N'-di (2,2,6,6-tetramethyl-4-piperidinyl)-hexane diamine)-4-(1-amino-1,1,3,3-tetramethylbutane) sym triazine, and dimethyl succinate polymer with 4-hydroxy-2,2,6,6-tetramethyl-1-piperidineethanol.

6. A composition as claimed in claim 4 wherein the second compound (B) (ii) is selected from the group consisting of diphenyl phenylenediamine, octylated diphenylamine, 4,4'-di (alpha, alpha'-dimethylbenzyl) diphenylamine, N-phenyl-N'-(1,3-dimethylbutyl)p-phenylenediamine and (4-anilinophenyl)-methacrylate.

7. A composition as claimed in claim 4 wherein the crosslinked organosilicon polymer or crosslinkable organosilicon prepolymer comprises residues derived from tetrahedral siloxysilanes.

8. A composition as claimed in claim 1 wherein the composition comprises a crosslinked organosilicon polymer or crosslinkable organosilicon prepolymer comprising alternating (a) cyclic polysiloxanes or siloxysilane residues and (b) polycyclic hydrocarbon residues derived from polycyclic polyenes having at least two carbon-carbon double bonds in their rings linked through carbon to silicon bonds (i).

9. A composition as claimed in claim 8 wherein the crosslinked organosilicon polymer or crosslinkable organosilicon prepolymer comprises residues derived from cyclic polysiloxanes.

10. A composition as claimed in claim 1 wherein the polycyclic hydrocarbon residues are derived from dicyclopentadiene.

11. A composition as claimed in claim 1, wherein the composition comprises a crosslinked organosilicon polymer or crosslinkable organosilicon prepolymer comprising residues derived from (a) a polyene having a molecular weight less than 500 having two non-aromatic carbon-carbon double bonds highly reactive in hydrosilation, the carbon-carbon double bonds being either in an alpha, beta or gamma position on a linear carbon moiety, next to two bridgehead positions in a strained polycyclic aliphatic ring structure, or in a cyclobutene ring; (b) a polycyclic polyene having two chemically distinguishable non-aromatic, non-conjugated carbon-carbon double bonds in its rings; and (c) a cyclic polysiloxane containing three or more SiH groups.

12. A process of forming a crosslinked organosilicon polymer or organosilicon prepolymer comprising reacting a siloxane selected from the group consisting of linear poly(organohydrosiloxane)s, cyclic polysiloxanes or siloxysilanes with a polycyclic polyene having at least two carbon-carbon double bonds in its rings in the presence of a hydrosilation catalyst and, as antioxidants, (i) at least one first compound containing a hindered phenol substituent and (ii) at least one second compound containing a substituent selected from the group consisting of hindered amines and aromatic amines.

13. The process as claimed in claim 12 wherein polymerization is promoted using a platinum catalyst.

14. The process as claimed in claim 12 wherein the second compound (B) (ii) is selected from the hindered amines.

15. The process as claimed in claim 12 wherein the second compound (B) (ii) is selected from the aromatic amines.

16. A process of forming a crosslinked organosilicon polymer comprising curing a prepolymer which is the partial reaction product of (a) at least one of a cyclic polysiloxane or a tetrahedral siloxysilane and (b) a polycyclic polyene having at least two carbon-carbon double bonds in its rings in the presence of a hydrosilation catalyst and, as antioxidants, (i) at least one first compound containing a hindered phenol substituent and (ii) at least one second compound containing a substituent selected from the group consisting of hindered amines and aromatic amines.

17. The process as claimed in claim 16 wherein the second compound (B) (ii) is selected from the hindered amines.

18. The process as claimed in claim 16 wherein the second compound (B) (ii) is selected from the aromatic amines.

19. The process as claimed in claim 12 wherein the first and second compounds (B) (i) and (ii) are octadecyl 3,5-di-tert-butyl 4-hydroxyhydrocinnamate and bis (1,2,2,6,6-pentamethyl-4-piperidinyl) sebacate.

20. A composition as claimed in claim 1 wherein the first and second compounds (B) (i) and (ii) are octadecyl 3,5-di-tert-butyl 4-hydroxyhydrocinnamate and bis (1,2,2,6,6-pentamethyl-4-piperidinyl) sebacate.

* * * * *